United States Patent
Iizuka

[19]

[11] Patent Number: 5,877,808
[45] Date of Patent: Mar. 2, 1999

[54] IMAGE PICKUP UNIT HAVING REDUCED SIGNALING LINES

[75] Inventor: Tetsuya Iizuka, Kanagawa, Japan

[73] Assignee: Sony Corporation, Tokyo, Japan

[21] Appl. No.: 637,186

[22] Filed: Apr. 24, 1996

[30] Foreign Application Priority Data

Apr. 25, 1995 [JP] Japan .................................. 7-124245

[51] Int. Cl.$^6$ ................................................ H04N 5/335
[52] U.S. Cl. ........................... 348/311; 348/296; 348/312
[58] Field of Search ................................ 348/296, 311, 348/312, 320, 294, 297, 298, 317

[56] References Cited

U.S. PATENT DOCUMENTS

| | | | |
|---|---|---|---|
| 4,498,106 | 2/1985 | Sato | 348/312 |
| 4,742,395 | 5/1988 | Nagai | 348/296 |
| 5,012,339 | 4/1991 | Kurata | 348/526 |
| 5,286,989 | 2/1994 | Yonemoto | 348/311 |
| 5,287,192 | 2/1994 | Iizuka | 348/311 |
| 5,659,359 | 8/1997 | Mochizuki | 348/296 |

OTHER PUBLICATIONS

Microelectronics: Didital and Analog Circuit and Systems by Jacob Millman,Ph.D., Published by McGraw–Hill Book Company, pp. 91–93, 1979.

*Primary Examiner*—Tuan Ho
*Attorney, Agent, or Firm*—Hill & Simpson

[57] ABSTRACT

A CCD image pickup unit in which at least a part of pulses necessary for driving vertical shift registers and a horizontal shift register of a CCD solid-state image pickup and a reset transistor is formed by decoding performed by a decoder using two kinds of input pulses is arranged to reduce the number of wiring lines for connection. A decoder, a vertical shift register driver for driving the vertical shift registers by receiving an output from the decoder, and a horizontal shift register driver for driving the horizontal shift register by receiving an output from the decoder are formed in one integrated circuit.

8 Claims, 13 Drawing Sheets

IMAGE PICKUP UNIT HAVING REDUCED SIGNALING LINES

BACKGROUND OF THE INVENTION

1. Field of the Invention

The present invention relates generally to image pickup units and, more particularly, to an image pickup unit using charge coupled devices (CCD) which has a comparatively small number of component integrated circuits (IC) and in which the number of wiring lines for connection between ICs can be reduced.

2. Description of the Related Art

Generally, CCD image pickup units presently used in video cameras for home and personal use are IT (interline transfer) type CCD image pickup units, which are ordinarily constituted of a timing generator, a vertical transfer register driver, an electronic shutter driver and a CCD solid-state image pickup. Transfer in vertical transfer registers is performed with transfer pulses in four phases, and reading from each of pixels is performed with two read pulses. Transfer in a horizontal transfer register is performed with transfer pulses in two phases. A reset pulse is required for driving a reset transistor for resetting a floating diffusion region, which corresponds to an output point at the time of reading.

If irising is automatically performed by an electronic shutter function, it is necessary to supply electronic shutter pulses to a substrate bias circuit.

FIG. 14 is a schematic diagram of the configuration of a conventional CCD image pickup unit for cameras.

In the figure are illustrated a timing generator a, a CCD solid-state image pickup b, a vertical transfer register driver c and an electronic shutter driver d. Each of numerals 3, 4, 6, 1, 1 written at lines in the figure represents the number of kinds of pulses. Pulses H1 and 2 are transmitted directly from the timing generator a to (a horizontal transfer register of) the CCD solid-state image pickup b as transfer pulses for horizontal transfer registers. A reset pulse RG for driving a reset transistor is also transmitted directly to the CCD solid-state image pickup b.

Pulses V1 to V4 for transfer pulses for the vertical transfer registers and pulses SG1 and SG2 are output from the timing generator a to the vertical transfer register driver c. The vertical transfer register driver c forms vertical transfer pulses $\phi$V1 to $\phi$V4 on the basis of the pulses V1 to V4 and SG1 and SG2 and sends the vertical transfer pulses $\phi$V1 to $\phi$V4 to (the vertical transfer registers of) the CCD solid-state image pickup b.

Further, a shutter pulse DSUB is sent from the timing generator a to the electronic shutter driver d. The driver d forms a shutter pulse $\phi$DSUB on the basis of the shutter pulse DSUB and sends the shutter pulse $\phi$DSUB directly to (a substrate bias circuit of) the CCD solid-state image pickup b.

FIG. 15 is a diagram of the configuration of the conventional CCD solid-state image pickup b. The CCD solid-state image pickup b has an image pickup area b, light receiving diodes f which correspond to the pixels. The vertical transfer registers are indicated by g, the horizontal transfer register is indicated by h. The horizontal transfer register h is controlled by the above-mentioned reset pulse RG. The substrate bias circuit, indicated by j, is formed of voltage-dividing resistors R1 and R2 and a diode D1. A voltage divided by the voltage-dividing resistors R1 and R2 is normally applied to the substrate through the diode D1. When shutter pulse $\phi$DSUB (e.g., 20 V) is applied, the potential of the substrate becomes equal to such a high level that charge accumulated in each pixel element f is forced to discharge to the substrate. This pulse $\phi$DSUB has substantially no influence upon other components because of the reverse current checking function of the diode D1.

The conventional CCD image pickup unit has a drawback in that the number of wiring lines between the CCD solid-state image pickup and the other ICs and between the ICs other than the CCD solid-state image pickup is large and there is, therefore, a limit to the reduction in the size of a video camera using the CCD image pickup unit.

More specifically, the number of the kinds of pulses output from the timing generator a to control the CCD solid-state image pickup b is ten. That is, there are reset pulse RG, horizontal transfer pulses H1 and H2 (transmitted directly to the CCD solid-state image pickup b), vertical transfer pulses V1 to V4, readout pulses SG1 and SG2 (sent to the vertical transfer register driver c), and electronic shutter pulse DSUB (sent to the electronic shutter driver d).

The number of the kinds of pulses input to the CCD solid-state image pickup b is eight, smaller by two than ten, the number of the kinds of pulses output from the timing generator a to control the CCD solid-state image pickup. This is because readout pulses SG1 and SG2 are superimposed on vertical transfer pulses V1 and V3, respectively, to be input to the CCD solid-state image pickup b by being included in $\phi$V1 and $\phi$V3. Consequently, a total of fifteen pulse lines are provided for wiring between the timing generator, the drivers and the CCD.

A CCD image pickup unit having such a large number of wiring lines between the chips constituting the unit has a large overall size and requires complicated wiring operations, which results are contrary to the present demand for smaller and low-priced CCD image pickup units' for home use and are, therefore, undesirable. The demand for a reduction in the size of CCD image pickup units for use in endoscopes is much stronger than that in the case of CCD image pickup units for home use. Thus, there is a strong demand for CCD image pickup units improved in this respect.

SUMMARY OF THE INVENTION

In view of the above-described problem, an object of the present invention is to provide a CCD image pickup unit in which at least a part of pulses necessary for driving vertical transfer registers and a horizontal transfer register of a CCD solid-state image pickup and a reset transistor for resetting a floating diffusion region in an output section of the horizontal transfer register is formed by decoding of two kinds of input pulses by a decoder, and in which the number of wiring lines between component chips of the CCD image pickup unit is reduced to reduce the size of the CCD image pickup unit.

To achieve this object, according to a first aspect of the present invention, there is provided an image pickup unit comprising a solid-state image pickup having a plurality of vertical shift registers and a horizontal shift register, a decoder for decoding two kinds of input pulses to form at least a part of pulses necessary for driving the vertical shift registers, the horizontal shift register and a reset transistor for resetting a floating diffusion region in an output section of the horizontal shift register, a vertical shift register driver for driving the vertical shift registers by receiving an output from the decoder, and a horizontal shift register driver for driving the horizontal shift register by receiving an output from the decoder, wherein the decoder, the vertical shift register driver and the horizontal shift register driver are formed in one integrated circuit.

According to a second aspect of the present invention, there is provided an image pickup unit comprising a solid-state image pickup region, a plurality of vertical shift registers and a horizontal shift register for transferring signals from the solid-state image pickup region, a decoder for decoding two kinds of input pulses to form at least a part of pulses necessary for driving the vertical shift registers, the horizontal shift register and a reset transistor for resetting a floating diffusion region in an output section of the horizontal shift register, a vertical shift register driver for driving the vertical shift registers by receiving an output from the decoder, and a horizontal shift register driver for driving the horizontal shift register by receiving an output from the decoder, wherein the solid-state image pickup region, the decoder, the vertical shift register driver and the horizontal shift register driver are formed in one integrated circuit.

According to a third aspect of the present invention, there is provided an image pickup unit comprising a solid-state image pickup region having pixels, a plurality of vertical shift registers and a horizontal shift register for transferring signals from the pixels of the image pickup region, and a decoder for decoding two kinds of input pulses to form pulses necessary for driving the vertical shift registers and the horizontal shift register, wherein a field discrimination pulse designating one of a first field and a second field is added to a pulse train of the input pulses at the trailing end thereof in a readout period for reading out signals from the pixels of the solid-state image pickup region to the vertical shift registers.

According to a fourth aspect of the present invention, in the image pickup unit in the third aspect of the invention, a final period in the readout period in which the field discrimination pulse designating one of a first field and a second field is added is set as a period for field discrimination, and vertical transfer operation in the readout period is completed before the beginning of the period for field discrimination.

According to a fifth aspect of the present invention, there is provided an image pickup unit comprising a solid-state state image pickup region having pixels, a plurality of vertical shift registers and a horizontal shift register for transferring signals from the pixels of the image pickup region, a decoder for decoding two kinds of input pulses to form pulses necessary for driving the vertical shift registers and the horizontal shift register, a shutter pulse indicating whether an electronic shutter is on or off being added to a pulse train of the input pulses, a substrate bias circuit, a detection circuit for detecting the shutter pulse, the detection circuit being provided on the output side of the decoder, and a shutter driver for driving the electronic shutter on the basis of an output from the detection circuit, the shutter driver being provided on the output side of the decoder.

According to a sixth aspect of the present invention, in the image pickup unit in the fifth aspect of the invention, the electronic shutter is always turned off in a first horizontal blanking period after driving the horizontal shift register for a first line after reading signals from the pixels of the solid-state image pickup region to the vertical shift registers.

According to a seventh aspect of the present invention, there is provided an image pickup unit comprising a solid-state image pickup region having pixels, a plurality of vertical shift registers and a horizontal shift register for transferring signals from the pixels of the image pickup region, a decoder for decoding two kinds of input pulses to form pulses necessary for driving the vertical shift registers and the horizontal shift register, and a reset gate connected to the horizontal shift register, wherein the reset gate is on during a greater part of a horizontal blanking period and during a readout period for reading signals from the pixels of the solid-state image pickup region to the vertical shift registers.

According to an eighth aspect of the present invention, there is provided an image pickup unit comprising a solid-state image pickup region, a plurality of vertical shift registers and a horizontal shift register for transferring signals from the solid-state image pickup region, a decoder for forming pulses necessary for driving the vertical shift registers and the horizontal shift register by decoding two kinds of input pulses which are pulses including vertical drive fundamental pulses and horizontal drive fundamental pulses and a selection pulse for discriminating the vertical and horizontal drive fundamental pulses from each other, and a substrate bias circuit, wherein a shutter pulse is superimposed on the selection pulse.

In the image pickup device according to the first aspect of the invention, the decoder can be controlled with a timing generator only by sending two kinds of signals to the decoder, and the decoder controls the vertical shift register and the horizontal shift register on the basis of the two kinds of signals. The vertical shift register and the horizontal shift register can perform, by seven signals, vertical transfer inclusive of reading signals from the pixels of the solid-state image pickup and vertical transfer inclusive of resetting. Two kinds of signals may suffice as signals output from the timing generator to perform vertical transfer and horizontal transfer. Also, seven kinds of signals may suffice as signals output from the decoder to the solid-state image pickup. Consequently, the number of wiring lines between the ICs can be reduced by four.

In the image pickup unit according to the second aspect of the invention, the decoder can be controlled with a timing generator only by sending two kinds of signals to the decoder, and the number of necessary wiring lines to the image pickup device can be reduced by twelve in comparison with the conventional arrangement because the decoder, the vertical shift register and the horizontal shift register controlled by the decoder and the solid-state image pickup region are combined into one chip.

In the image pickup device according to the third aspect of the invention, a determination is made as to whether there is a field discrimination pulse at the end of the readout period, thereby recognizing the next field as a first field or a second field. A vertical transfer pulse train for a first field or a second field can be selectively formed by the decoder on the basis of the result to this determination, thereby making it possible to perform interlacing without any hindrance.

In the image pickup unit according to the fourth aspect of the invention, a field discrimination pulse appears in the field discrimination period after vertical transfer in the corresponding readout period has been completed, and irregular field designation can be performed by addition or elimination of a pulse in this discrimination period without impeding the vertical transfer operation.

In the image pickup unit according to the fifth aspect of the invention, a shutter pulse indicating whether the electronic shutter is on or off is added to a pulse train of the input pulses to enable control of the electronic shutter by a two-valued digital signal.

In the image pickup unit according to the sixth aspect of the invention, the electronic shutter is always turned off in the first horizontal blanking period after driving the horizontal shift register for the first line after reading signals to the vertical shift registers, so that the image accumulation time can be maximized.

That is, when the signal reading operation is performed, the number of input pulses always becomes sufficiently large in the transfer period. Therefore, in the case where the electronic shutter is turned on at the time of the next line shifting if the number of pulses in the vertical transfer period is, for example, ten, and where the electronic shutter is turned off if the number of pulses is insufficient, the electronic shutter function is necessarily turned on at the time of the next line shifting after the reading operation, so that the signal accumulation time is reduced by the period of one line from the maximum time. In the image pickup unit according to the sixth aspect of the invention, however, the electronic shutter is turned off at the time of the next line shifting, thereby maximizing the signal accumulation time.

In the image pickup unit according to the seventh aspect of the invention, a reset transistor is on during a greater part of the horizontal blanking period and during the readout period for reading signals from the pixels in the solid-state image pickup region to the vertical shift registers, thereby preventing a sag which occurs in the reset transistor.

That is, if the reset transistor is turned off during the readout period, the off-time is considerably long and the absolute value of the potential of floating diffusion of the floating diffusion amplifier reading section provided on the output side of the horizontal shift register is reduced by discharge, so that a sag occurs in the output signal of the solid-state image pickup during the horizontal blanking period and the period for reading from light receiving elements corresponding to the pixels to the vertical shift registers, thereby liming the dynamic range of a circuit at a subsequent stage.

However, the image pickup unit according to the seventh aspect of the invention is arranged so that the reset gate is on during a greater part of the horizontal blanking period and during the readout period for reading signals from the pixels in the solid-state image pickup region to the vertical shift registers, thereby avoiding occurrence of a situation where the reset transistor is off for a long time. Accordingly, it is not possible that discharge can be caused for a long time by floating diffusion. Thus, a sag by floating diffusion can be prevented and a risk of limitation of the dynamic range at the subsequent stage can be avoided.

In the image pickup unit according to the eighth aspect of the invention, an electronic shutter pulse signal is superimposed on the selection pulse, so that the need for wiring only for transmitting the electronic shutter pulse is eliminated. The number of wiring lines of the image pickup unit having the electronic shutter function can be reduced correspondingly.

BRIEF DESCRIPTION OF THE DRAWINGS

FIG. 3(A) is a circuit diagram;

FIG. 3(B) is a pulse waveform diagram;

DESCRIPTION OF THE PREFERRED EMBODIMENTS

The present invention will be described in detail with respect to illustrated embodiments.

Figure 1:
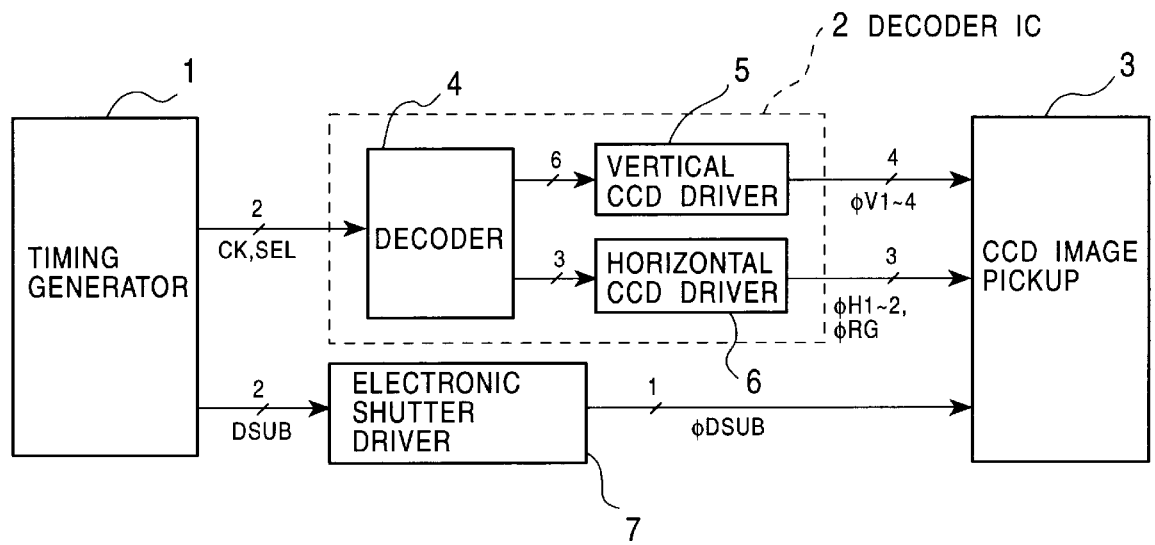
FIG. 1 is a block diagram schematically showing the configuration of a first embodiment of a CCD image pickup unit of the present invention.

FIG. 1 is a block diagram schematically showing the configuration of a first embodiment of the present invention.

Referring to FIG. 1, a timing generator 1 generates clock pulses CK for controlling a CCD solid-state image pickup, including both pulses for horizontal transfer driving and pulses for vertical driving, a pulse SEL for H-V (horizontal transfer-vertical transfer) separation, and a shutter pulse DSUB.

A decoder IC 2 has a vertical transfer register driver and a vertical transfer register driver as its internal sections. The decoder IC 2 receives the above-mentioned pulses CK and SEL and sends to the CCD solid-state image pickup 3 vertical transfer pulses $\phi V1$ to $\phi V4$, horizontal transfer pulses $H\phi 1$ and $H\phi 2$ and a reset pulse $\phi RG$ for controlling the CCD solid-state image pickup 3.

Figure 2:
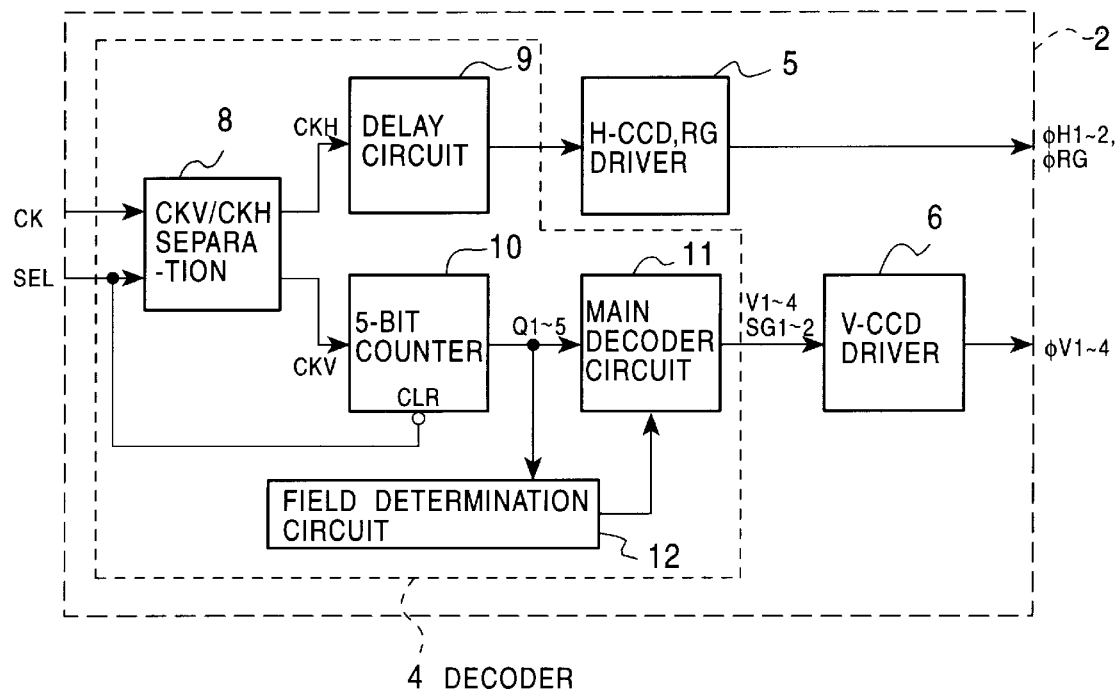
FIG. 2 is a block diagram schematically showing the configuration of a decoder IC of the image pickup unit shown in FIG. 1.

The decoder IC 2 is formed of a decoder 4, the vertical transfer register driver 5 and the horizontal transfer register driver 6 and has a configuration such as that shown in FIG. 2, which will be described below in detail.

An electronic shutter driver 7 generates a shutter pulse $\phi DSUB$ having an amplitude of, for example, 20 V on the basis of the shutter pulse DSUB from the timing generator 1 and sends the shutter pulse $\phi DSUB$ to a substrate bias circuit in the CCD solid-state image pickup.

The configuration of the decoder IC 2 will next be described with reference to FIG. 2.

A horizontal and vertical pulse separation circuit 8 has a function of distributing the above-mentioned clock pulses CK on the basis of the selection pulse SEL. That is, it distributes clock pulses CK so that horizontal drive clock pulses CKH in clock pulses CK are sent to a delay circuit 9 while vertical drive clock pulses CKV in clock pulses CK are sent to a 5-bit counter 10.

The 5-bit counter 10 counts the above-mentioned vertical drive clock pulses CKV and sends output signals Q1 to Q5 to a main decoder circuit 11. The main decoder circuit 11 forms vertical transfer pulses V1 to V4 and readout signals SG1 and SG2 on the basis of the signals Q1 to Q5 that it has received and a field determination signal described below. The main decoder circuit 11 sends to the vertical transfer register driver 6 vertical transfer pulses V1 to V4 and readout signals SG1 and SG2 that it has formed. The driver 6 sends vertical transfer pulses φV1 to φV4 including readout signals SG1 and SG2 to the CCD solid-state image pickup 3.

A field determination circuit 12 determines whether a field which starts presently is a first field (odd field) or a second field (even field) and sends a field determination signal representing the result of the determination to the above-mentioned main decoder circuit 11. Field determination is made in this manner for the purpose of discriminating one of the first and second fields from the other as the next field and enabling the main decoder circuit 11 to generate vertical transfer pulses φV1 to φV4 by a timing in accordance with the discriminated field, because vertical transfer pulse φV1 to φV4 are to be generated by different timings with respect to fields if interlacing is performed.

Field discrimination is performed by counting the number of pulses of vertical drive fundamental pulses CKV in the preceding readout period, as described below.

Figure 3A:
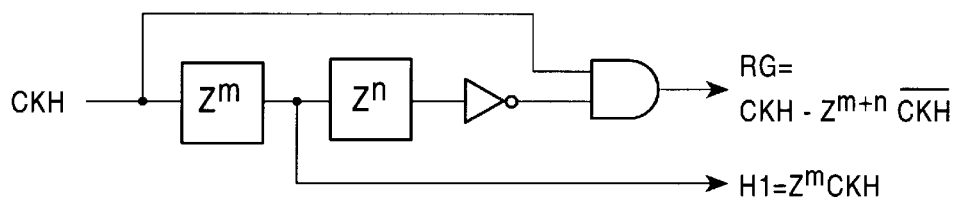
FIGS. 3(A) and 3(B) show a reset pulse generation circuit provided in a horizontal transfer register driver of the image pickup unit shown in FIG. 1.
Figure 3B:
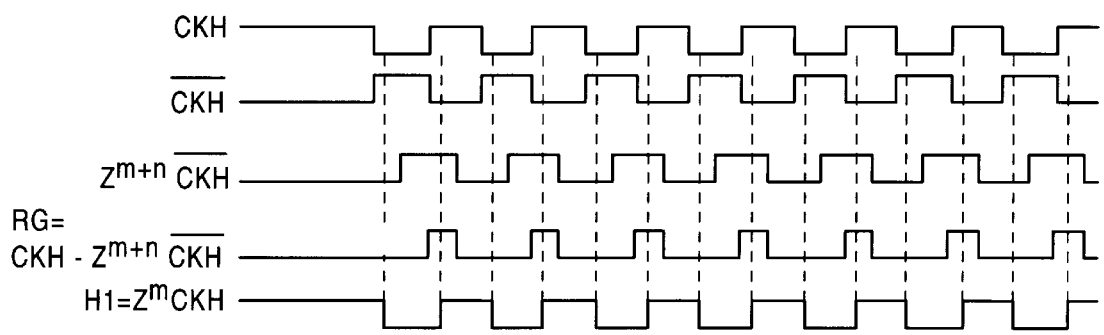

FIGS. 3(A) and 3(B) show a reset pulse generation circuit provided in the above-mentioned delay circuit 9. FIG. 3(A) is a circuit block diagram and FIG. 3(B) is a pulse waveform diagram.

This reset pulse generation circuit forms reset pulse RG from horizontal drive fundamental pulse CKH.

Figure 4:
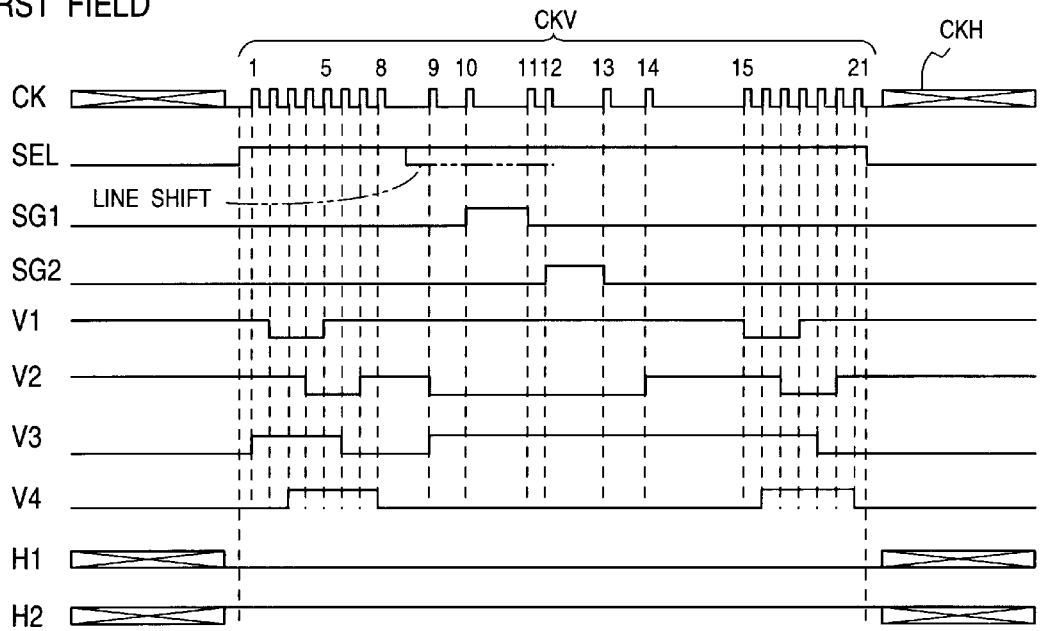
FIG. 4 is a timing chart of the operation of the image pickup unit shown in FIG. 1.
Figure 4:
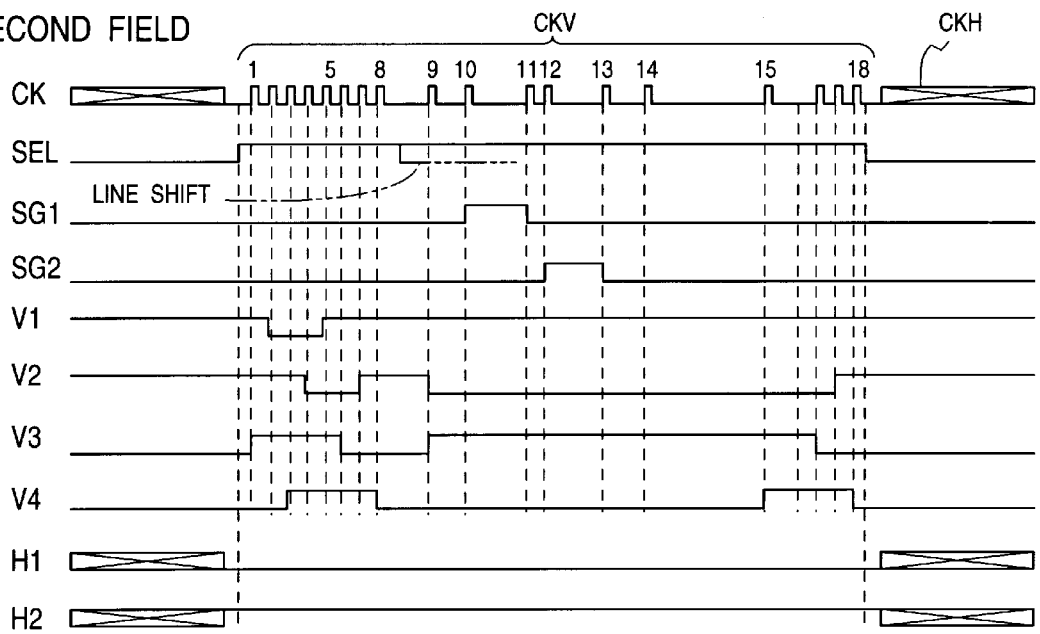

FIG. 4 is a timing chart for explaining the operation of the CCD image pickup unit of this embodiment. The upper section of FIG. 4 shows the timing of the first field while the lower section shows the timing of the second field.

Clock pulses CK include pulses CKV which designate times of changes of pulses V1 to V4, SG1 and SG2, and include pulses CKH which designate times of changes of pulses H1 and H2. When selection pulse SEL is high, pulse CK is sent as vertical drive fundamental pulse CKV to the 5-bit counter 10. When selection pulse SEL is low, pulse CK is sent as horizontal drive fundamental pulse CKH to the delay circuit 9. Thus, pulses CKH and CKV can be separated from clock pulses CK.

Field discrimination necessary if interlacing is performed is made in such a manner that the number of pulses CKV is counted in the readout period before the field to be discriminated (the period in which signal charge is read from each of the light receiving elements corresponding to pixels to the vertical transfer register) and a determination is made as to whether the counted number is larger or smaller than a certain number (e.g., 20).

More specifically, in this embodiment, the number of pulses CKV during the readout period is set to 21 with respect to the first field and to 18 with respect to the second field. That is, clock pulses CK are supplied from the timing generator 1 in accordance with this condition.

Accordingly, if the number of pulses CKV is 21 in a cycle of the readout period while SEL is high, pulses V1 to V4, SG1 and SG2 of the second field timing are decoded from clock pulses CK. If the number of pulses CKV is 18, pulses V1 to V4, SG1 and SG2 of the first field timing are decoded from clock pulses CK.

In this embodiment, the line shifting operation may be performed in such a manner that selection pulse SEL at the high level is inverted to the low level at a moment in the time period between the eighth one and the ninth one of pulses CKV issued after selection pulse SEL has become high, as indicated by the broken line in FIG. 4.

An electronic shutter function of this embodiment is, for example, based on the ordinary method of forcing signal charge accumulated in each of the light receiving elements corresponding to the pixels to flow to the substrate by supplying shutter pulse φDSUB to the substrate bias circuit. Shutter pulse φDSUB is produced by the electronic shutter driver 7 on the basis of pulse DSUB from the timing generator 1.

Figure 14:
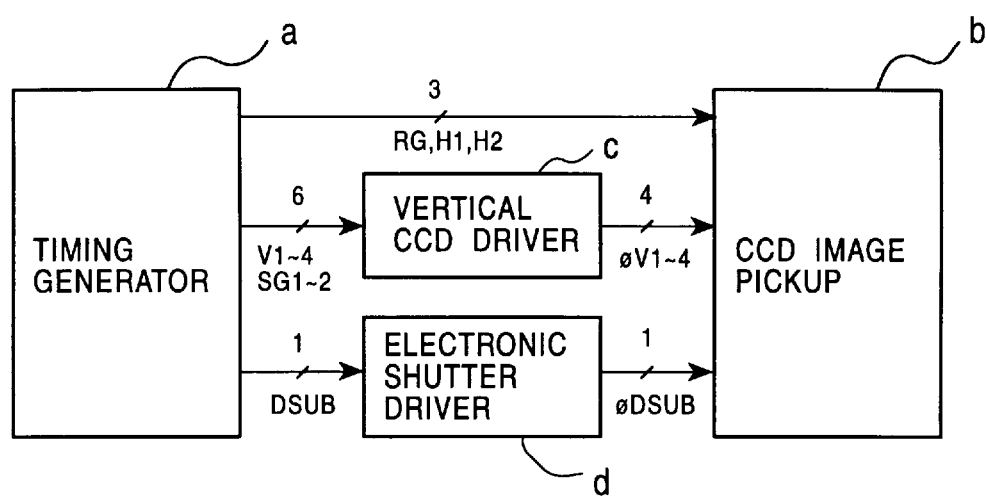
FIG. 14 is a block diagram schematically showing the configuration of a conventional CCD image pickup unit.
Figure 15:
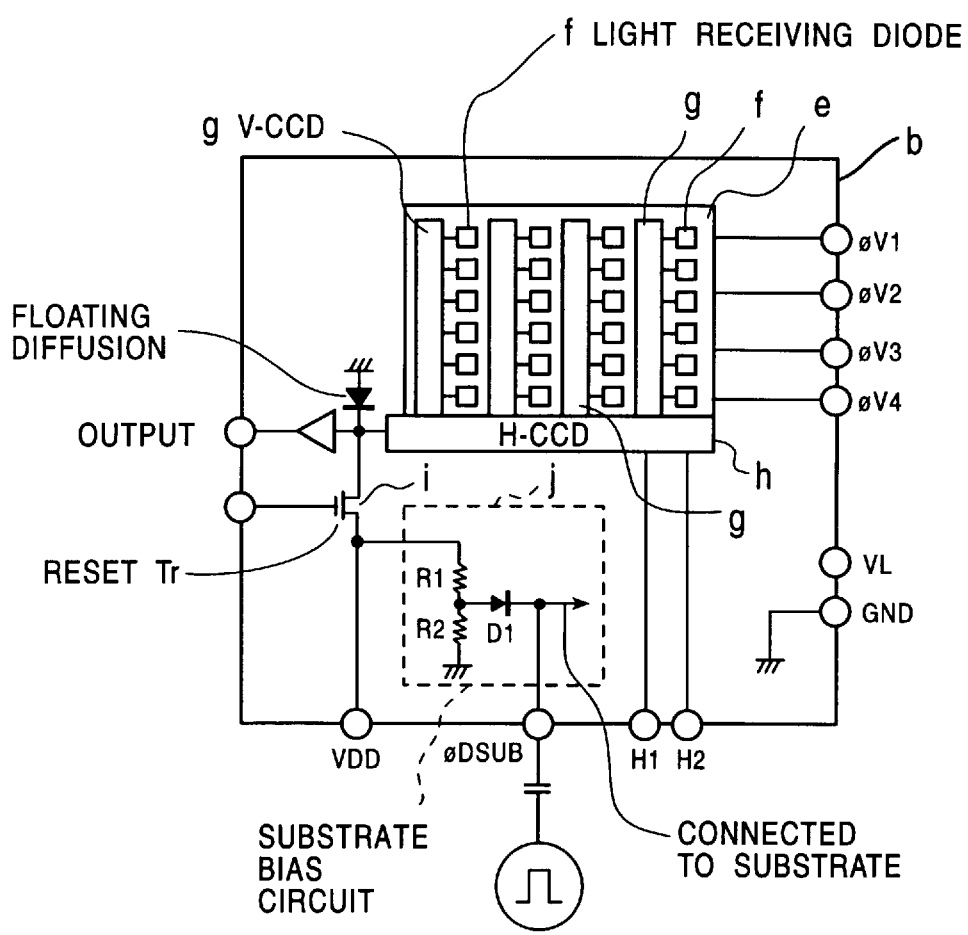
FIG. 15 is a diagram showing the configuration of a CCD solid-state image pickup of the conventional CCD image pickup unit.

In the CCD image pickup unit of this embodiment, as is apparent from comparison between FIGS. 1 and 14, the decoder IC 2 is provided to reduce the number of kinds of pulses output from the timing generator 1 from ten to three. Accordingly, if this decoder IC 2 is provided in a camera head, the number of wiring lines for pulses from the camera head can be reduced from ten to three; seven wiring lines can be removed from the ten wiring lines conventionally required.

Figure 5:
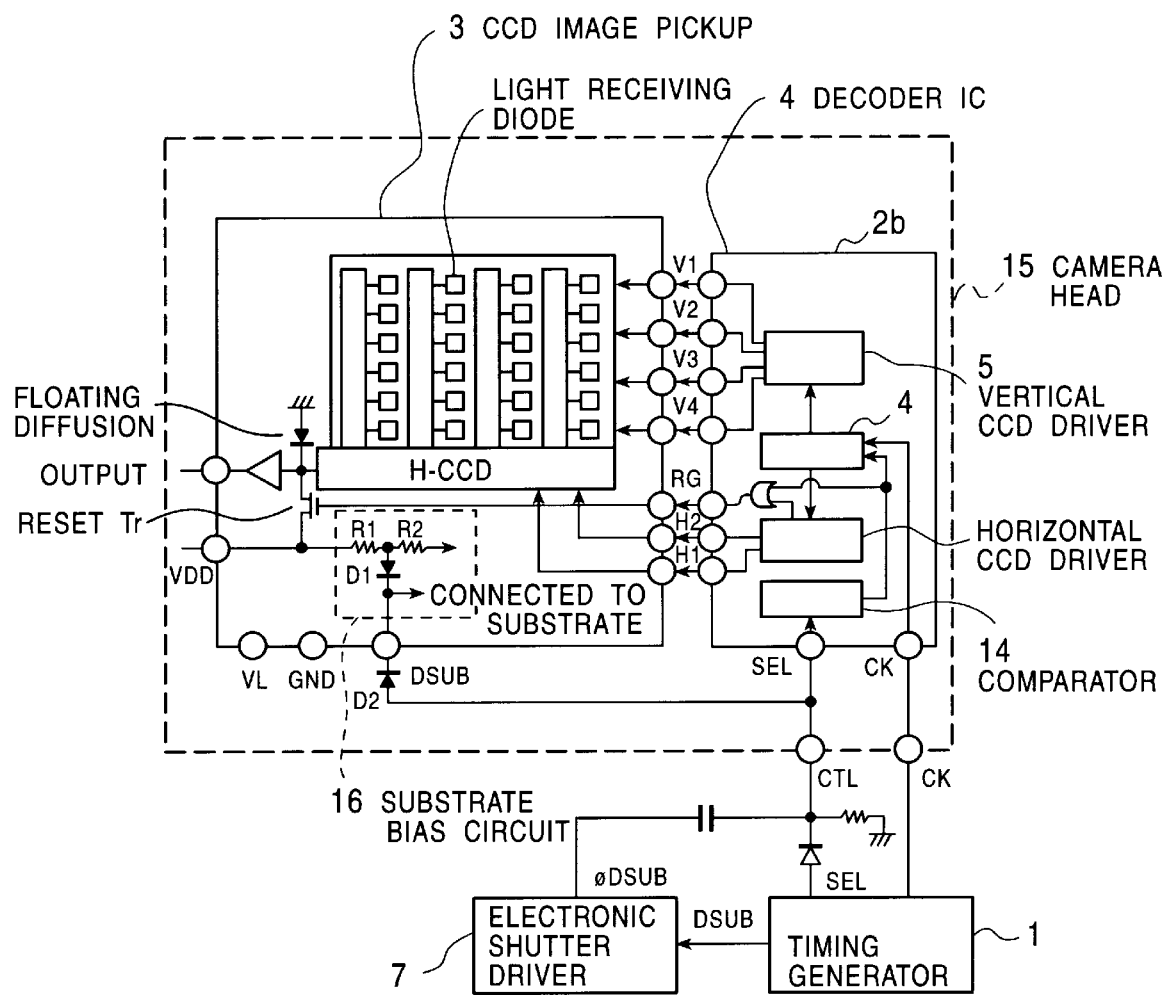
FIG. 5 is a block diagram schematically showing the configuration of a. second embodiment of the CCD image pickup unit of the present invention.
Figure 6:
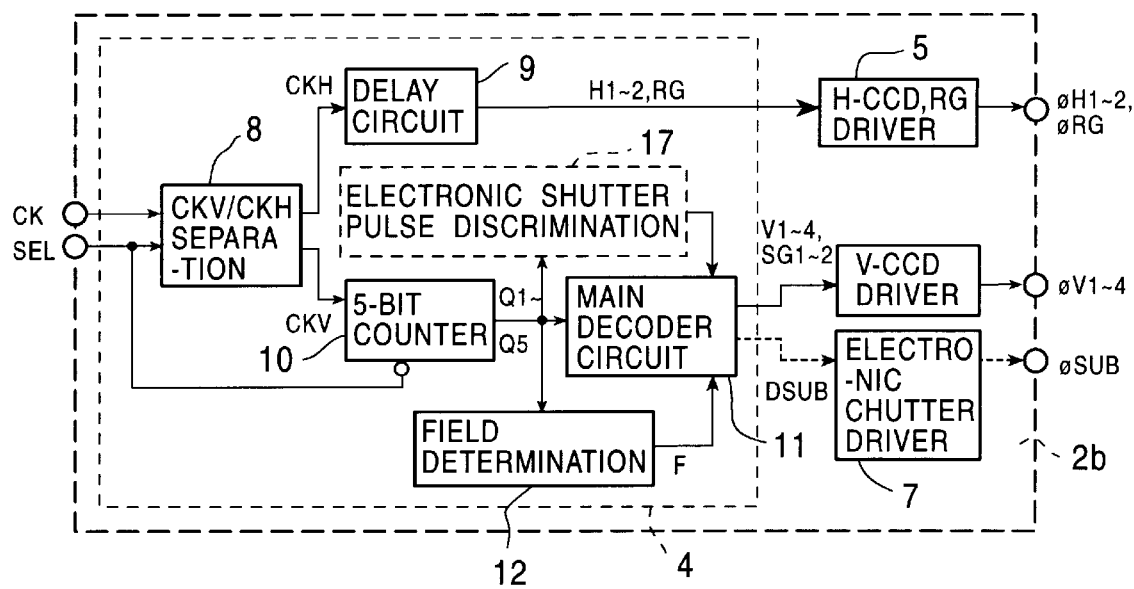
FIG. 6 is a block diagram of a decoder IC of the image pickup unit shown in FIG. 5.
Figure 7:
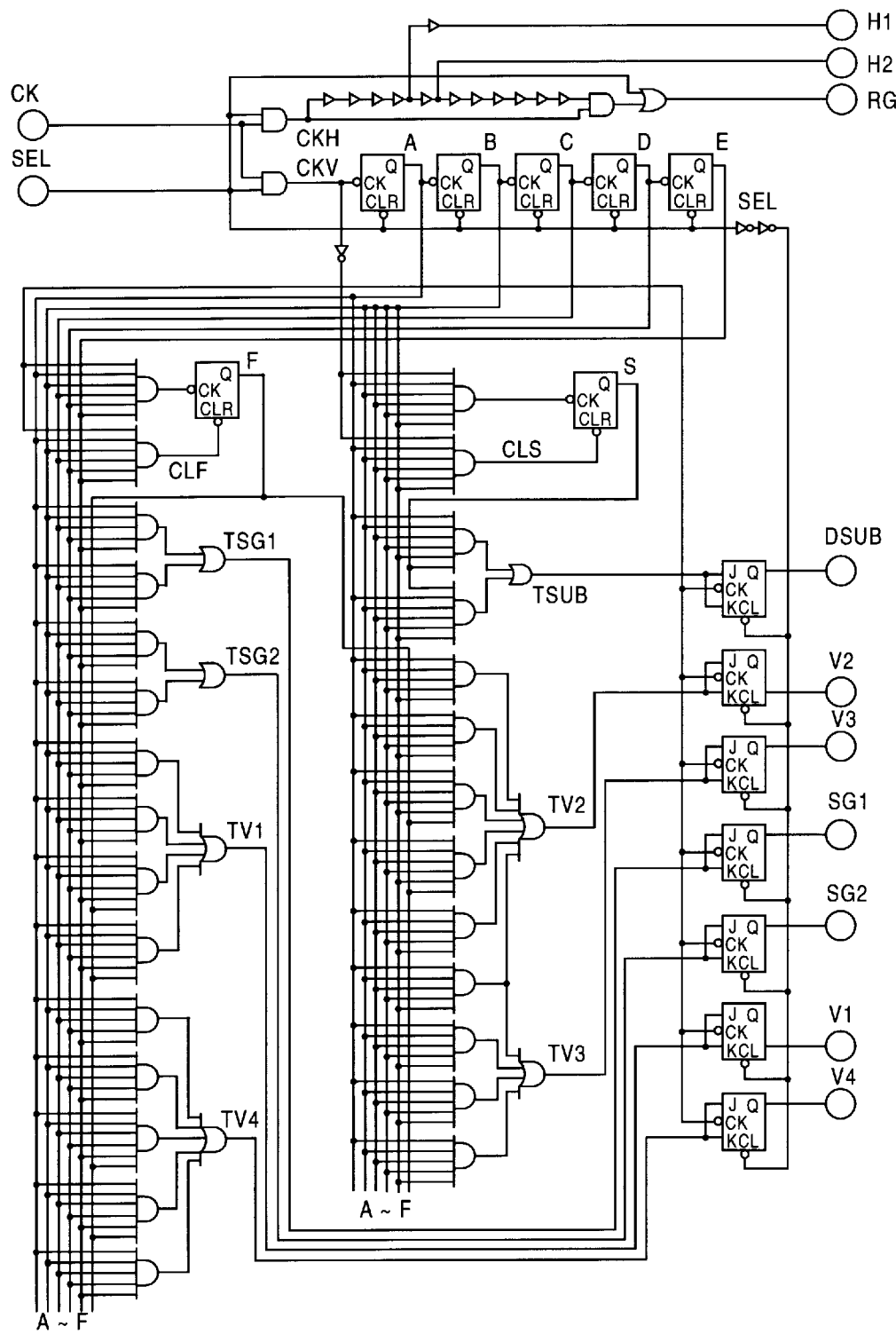
FIG. 7 is a block diagram of a main decoder circuit of the image pickup unit shown in FIG. 5.
Figure 8:
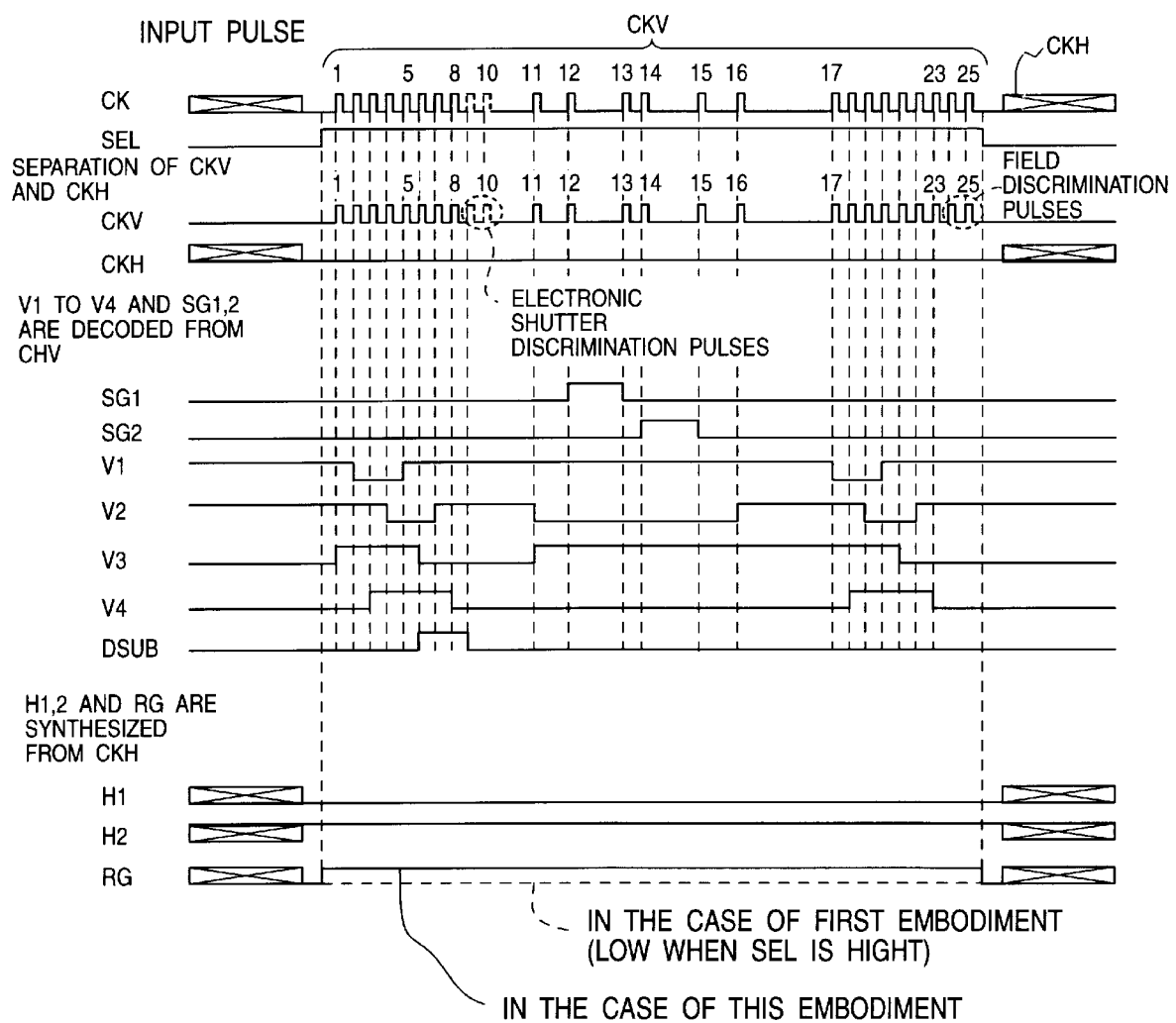
FIG. 8 is a timing chart showing the operation of the decoder of the image pickup unit shown in FIG. 5.
Figure 9:
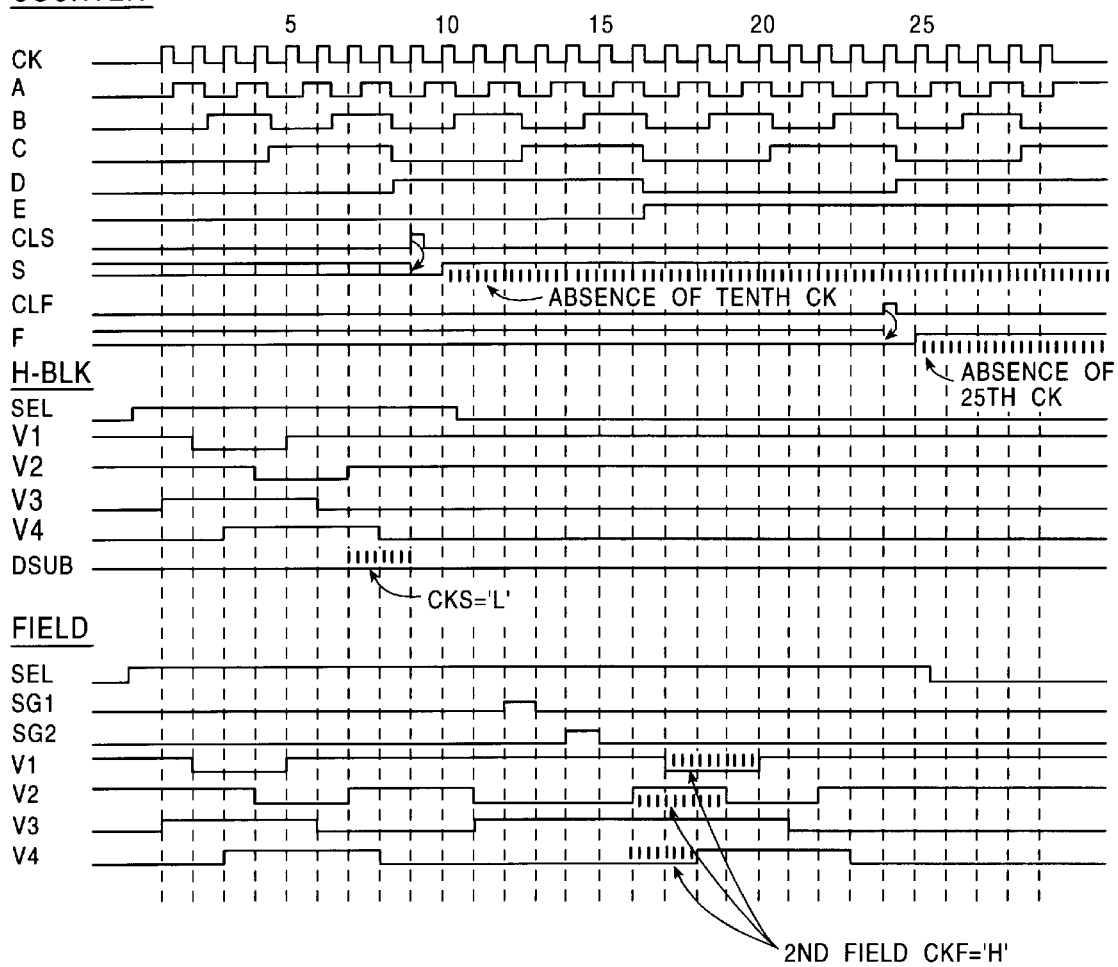
FIG. 9 is a timing chart showing the operation of a counter and other operations of the image pickup unit shown in FIG. 5.
Figure 10A:
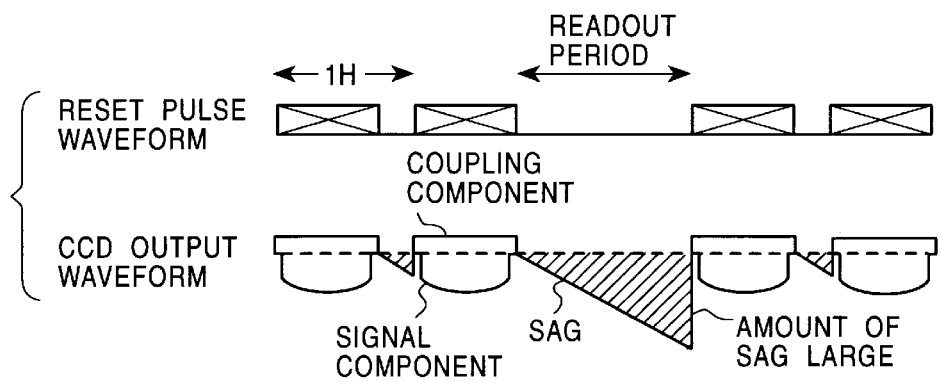
FIGS. 10(A) and 10(B) are waveform diagrams of reset pulses and a CCD output in the image pickup unit shown in FIG. 5 in the case of the first embodiment and the second embodiment, respectively.
Figure 10B:
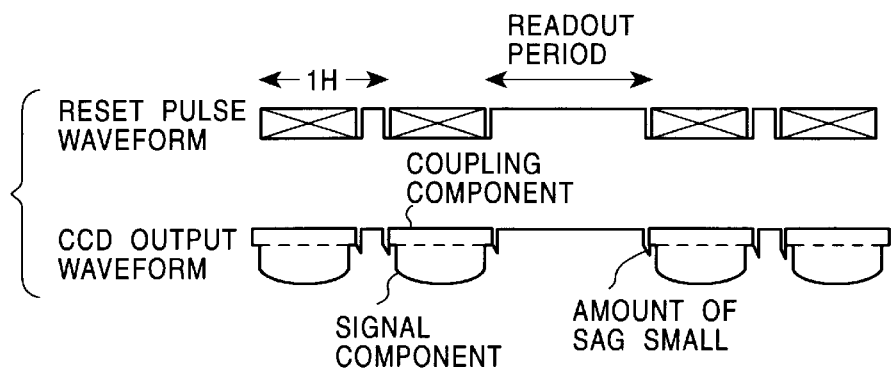
Figure 11:
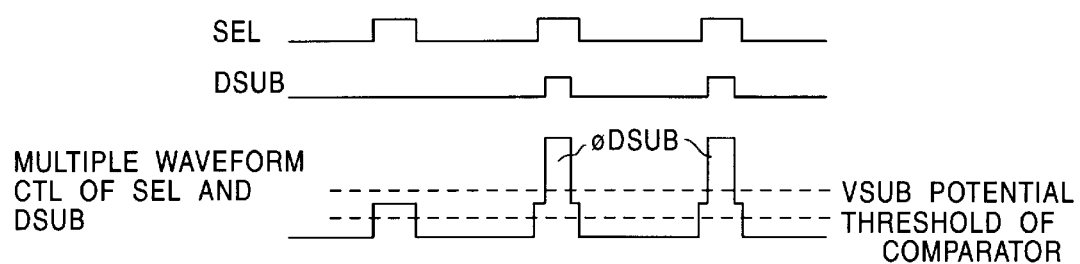
FIG. 11 is a waveform diagram of selection signal SEL and shutter pulses DSUB of the image pickup unit shown in FIG. 5.

FIGS. 5 to 11 show a second embodiment of the CCD image pickup of the present invention. FIG. 5 is a block diagram schematically showing the configuration of this embodiment, FIG. 6 is a block diagram of a decoder IC, FIG. 7 is a block diagram of a main decoder circuit, FIG. 8 is a timing chart showing the operation of the decoder, and FIG. 9 is a timing chart showing the operation of a counter and other operations. FIGS. 10(A) and 10(B) are waveform diagrams of reset pulses and a CCD output, FIG. 10(A) relating to the first embodiment, FIG. 10(B) relating to this embodiment (second embodiment). FIG. 11 is a waveform diagram of selection signal SEL and shutter pulses DSUB. The circuit configuration of the decoder IC 2*b* shown in FIG. 6 is basically the same as the corresponding circuit configuration in the first embodiment, but it is shown for explanation of an example of a modification described below.

This embodiment is basically such that shutter pulse φDSUB which is output from electronic shutter driver 7 is input to a camera head 15 through an input terminal through which selection pulse SEL is also input, thereby making it possible to reduce the number of signal lines connected to the camera head. More specifically, timing generator 1 outputs signals SEL, CK and DSUB and electronic shutter driver 7 receives signal DSUB and increases the amplitude of this signal. The signal DSUB amplitude-increased is superimposed on the signal SEL, as shown in FIG. 11, and the superimposed signal is input to a terminal CTL of camera head 15.

That is, while clock pulses CK from timing generator 1 are input to one input terminal of the camera head 15, selection signal SEL and shutter pulse φDSUB are input to another input terminal. The input terminal CTL is used in common to input signals SEL and φDSUB. Accordingly, the number of signal lines connected to the camera head can be reduced.

Signal SEL is, for example, pulses of 5 V while signal φSUB is pulses of 20 V. The difference between the amplitudes thereof is large. These two signals are input to one input terminal of decoder IC 2b in camera head 15. Decoder IC 2b, however, requires only selection signal SEL in the two signals. Therefore, a high-withstand-voltage comparator 14 is provided in a stage in front of main decoder circuit 4 to extract only signal SEL.

On the other hand, the two signals are input to a shutter pulse input terminal of CCD solid-state image pickup 3. However, the amplitude of signal SEL is 5 V and signal SEL is not transmitted to the substrate by the function of substrate bias circuit 16. Accordingly, it is impossible to discard the signal charge. Only signal φDSUB having a large amplitude of, for example, 20 V is transmitted to the substrate when it is input, thereby enabling the accumulated signal in each of the light receiving elements corresponding to the pixels to be discarded by being discharged to the substrate.

This embodiment has several other features, which will be described one by one.

First, field discrimination in this embodiment differs from that in the first embodiment, as described below in detail.

That is, in the first embodiment, field discrimination is made on the basis of the number of clock pulses CK in the readout period. In more detail, the field number is determined according to whether the number of pulses is 21 or 18. If the number of pulses is 21, it is determined that the next readout timing is the second-field timing. If the number of pulses is 18, it is determined that the next readout timing is the first-field timing. Accordingly, a second field necessarily follows a first field, and a first field necessarily follows a second field.

In ordinary situations, no problem is encountered with respect to such operation. However, there is a need for correction by a step corresponding to one scanning line, for example, in the case of a function of electronically preventing an influence of a camera shake of a video camera. If such correction is performed, a need sometimes occurs to set a first field subsequent to a preceding first field or to set a second field subsequent to a preceding second field. Therefore, the CCD image pickup unit of the first embodiment is incapable of satisfying such a requirement.

In contrast, this embodiment is arranged to satisfy such a requirement. More specifically, a field discrimination period is set at the end of the readout period, outputting vertical transfer pulses V1 to V4 is completed before the beginning of this field discrimination period, and field discrimination is made according to whether some vertical drive fundamental pulse CKV exists in the field discrimination period.

In more detail, the timing of vertical transfer pulses V1 to V4 is set so that the vertical transfer operation to be performed in the present readout period is finished when the 23rd one of pulses CKV in the readout period (see FIG. 8) appears. The field discrimination period is defined as the time period from this time to the end of the readout period. If some pulse CKV exists in the field discrimination period, the next reading refers to a second field. If no pulse CKV appears, the next reading refers to a first field. In this embodiment, two pluses CKV, i.e., 24th and 25th pluses CKV, appear in the field discrimination period in the case of existence, and field discrimination is made according to whether the CKV count value has become equal to 25.

Then, the next field can be irregularly set as a first field by forcing elimination of the 25th one of pulses CKV in the readout period of a first field. In the second field readout period, no clock pulse CK is generated from timing generator 1 to become CKV in the field discrimination period. Normally, therefore, the next field is a first field. However, a second field can be irregularly set instead of a first field by forcing generation of 24th and 25th pulses in the field discrimination period.

The arrangement may also be such that the discrimination period is lengthened to increase the number of pulses CKV in the discrimination period, thereby enabling changing of other timing patterns, e.g., changing between field reading and frame reading as well as field changing.

Further, in this embodiment, reset pulse RG for controlling the reset transistor (see FIG. 5) is held high through a greater part of the H-blanking period and through the time period for performing the reading operation (see the bottommost section of FIG. 8), thereby avoiding occurrence of a situation where the reset transistor is off for a long time. Accordingly, it is possible to suppress a sag at an output section (floating diffusion region) of the CCD solid-state image pickup 3 to prevent limitation of the dynamic range at a subsequent stage. The following is a detailed description about this point made with reference to FIG. 10.

That is, in the first embodiment, reset pulse RG is formed on the basis of horizontal drive fundamental pulse CKH by using a circuit such as that shown in FIG. 3 and is transmitted as a control pulse directly to the reset transistor. Therefore, it is impossible for the reset pulse to become high during a time period when horizontal drive fundamental pulse CK is not selected. Thus, the off-state of the reset transistor continues through the readout period, as shown in FIG. 10(A).

If the reset transistor continues being off for a time period as long as the readout period, the potential of the floating diffusion region becomes so low (see FIG. 10(A)) that a sag occurs which causes a considerable reduction in dynamic range at the subsequent stage of the CCD solid-state image pickup. This is one of few drawbacks of the first embodiment.

In contrast, in this embodiment (second embodiment), output pulse RG from a reset pulse generation circuit which is provided in horizontal transfer register driver 6 and which has, for example, the same configuration as the reset pulse generation circuit shown in FIG. 3 is input to one of two input terminal of an OR circuit while selection pulse SEL is input to the other input terminal, and an output of this OR circuit is input to the gate of the reset transistor.

Accordingly, the reset pulse becomes high during the readout period, as shown in FIG. 10(B). That is, the reset transistor also becomes high when selection pulse SEL is high, i.e., when vertical drive fundamental pulse CKV is selected as well as when the output RG of the reset pulse generation circuit shown in FIG. 3 is high, thereby preventing long duration of a sag. Consequently, the amount of sags is largely reduced and there is no risk of the dynamic range at the subsequent stage of the CCD solid-state image pickup being considerably reduced by the influence of sags.

An example of a modification of this embodiment will next be described.

In this modified example, as indicated by the broken line in FIG. 6, an electronic shutter pulse discrimination circuit 17 is provided in decoder 4, and an electronic shutter driver 7 is provided in decoder IC 2b. Also, as indicated by the broken line in FIG. 8, electronic shutter discrimination pulses (the ninth and tenth pulses CKV in FIG. 8) are added to vertical drive fundamental pulses CKV. These pulses are detected by electronic shutter pulse discrimination circuit 17. When these pulses are detected, electronic shutter driver 7 generates shutter pulse φDSUB to discharge the accumulated charge by the next line shifting.

The arrangement may be such that if a vertical drive fundamental pulse CKV exists as the tenth pulse (after the moment at which selection signal SEL becomes high) in the vertical transfer period, the electronic shutter is turned on at the time of the next line shifting, and that if no pulse CKV exists as the tenth pulse, the electronic shutter is turned off at the time of the next line shifting. The arrangement may alternatively be such that, conversely, the electronic shutter is turned off at the time of the next line shifting if the corresponding pulse CKV appears, or turned on if no corresponding pulse CKV exists.

If, as described above, determination is made according to the presence or absence of the tenth pulse CKV as to whether the electronic shutter is turned on at the time of next line shifting, then the electronic shutter driver 7 shown in FIG. 5, that receives DSUB from timing generator 1, is not necessary. Instead of this, the electronic shutter driver 7 for forming shutter pulse φDSUB on the basis of an output of the above-mentioned electronic shutter pulse discrimination circuit 17, indicated by the broken line in FIG. 6, is provided. The output of this driver 7 is applied to substrate bias circuit 16.

The method of turning on or off the electronic shutter according to whether the tenth vertical drive fundamental pulse CKV exists in an electronic shutter discrimination period, as described above, is used for the purpose of eliminating the need for providing a high-withstand-voltage input circuit in the IC and controlling the electronic shutter only by two-valued digital signals. In this modified example, there is no need for high-withstand-voltage comparator 14.

Also, there is no need to send shutter pulse DSUB as an independent signal from timing generator to camera head 15. A pulse is generated only as clock pulse CK by a predetermined timing to control electronic shutter driver 7 generating shutter pulse φDSUB so as to discharge the accumulated charge at the time of the next line shifting. Thus, this arrangement also has the advantage of correspondingly reducing the number of wiring lines connected to the camera head.

In the case where a shutter pulse is added to clock pulses CK, where the on- and off-states of the electronic shutter are discriminated by electronic shutter pulse discrimination circuit 17, and where φDSUB is generated from electronic shutter driver 7 according to the result of this discrimination by a predetermined timing at the time of the next line shifting, it is preferred that the electronic shutter is always turned off in the first H blanking period after driving the horizontal transfer register by one line after the completion of reading from each of the light receiving elements corresponding to the pixels to the vertical transfer register.

This is because the accumulation time period can be maximized thereby. To actually do so, the electronic shutter is turned off at the time of the next line shifting if the CKV exists in the electronic shutter discrimination period, and the electronic shutter is turned on at the time of the next line shifting if no CKV exists, as described below in detail.

That is, in the case of the design made to turn off the electronic shutter at the time of the next line shifting if the tenth pulse CKV does not appear in the electronic shutter discrimination period and to turn on the electronic shutter at the time of the next line shifting if the tenth pulse CKV appears, 10 or more pulses CKV exist certainly with respect to the reading operation shown in FIG. 8 and, accordingly, the electronic shutter is necessarily turned on at the time of line shifting 1H thereafter. Turning-off of the electronic shutter is possible only from the time of the next but one line shifting after the completion of reading. Thus, even when maximization of the accumulation time period is particularly required, the accumulation time period is shorter by the period of one line. In fact, even in a situation where an object is so dark that the opening of the electronic iris should be maximized, the opening of the electronic iris cannot be maximized because the number of pulses CKV in the period when signal SEL is high is necessarily large during the reading operation, as shown in FIG. 9.

On the other hand, in the case of the design made to turn off the electronic shutter at the time of the next line shifting if the tenth pulse CKV appears in the electronic shutter discrimination period and to turn on the electronic shutter at the time of the next line shifting if the tenth pulse CKV does not appear, 10 or more pulses CKV appear certainly in the period when signal SEL is high with respect to the reading operation as shown in FIG. 8 and, accordingly, the electronic shutter is turned off at the time of the next line shifting to inhibit discharge of the accumulated charge. Thus, the accumulation period can be maximized.

In this case, the electronic shutter is, of course, turned off at the time of line shifting 1H after the reading operation. This entails essentially no problem for the following reason. Essentially, discharge of the accumulated charge by the electronic pulse is made by discharging the charge accumulated in each of the light receiving elements corresponding to the pixels immediately before exposure is started. There is no problem except for a special case where there is a need to shorten the exposure time by 1H (about 65 $\mu$sec) from the field period, 1/60 second (with respect to the NTSC system, for example).

Figure 12:
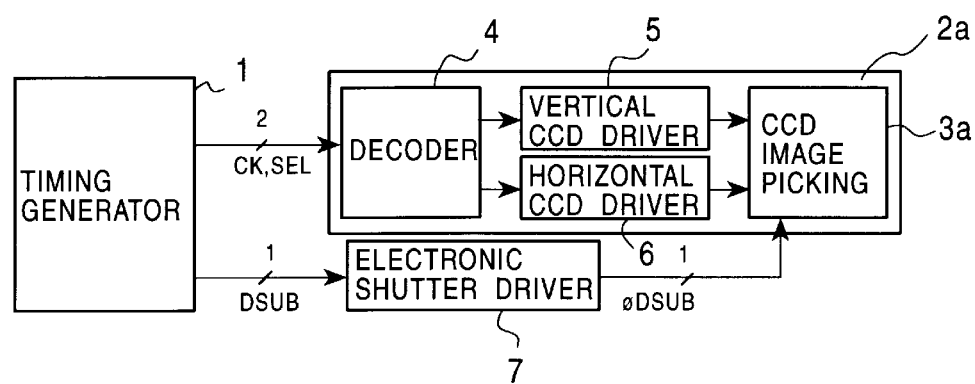
FIG. 12 is a block diagram schematically showing the configuration of a third embodiment of the CCD image pickup unit of the present invention.

FIG. 12 is a block diagram schematically showing the configuration of a third embodiment of the CCD image pickup unit of the present invention.

In this embodiment, a decoder IC and a CCD solid-state image pickup 3 are integrally combined with each other, that is, combined into one chip.

A decoder IC and a CCD solid-state image pickup are integrally combined into an IC 2a. A block 3a represents a solid-state image pickup section in the IC 2a. The solid-state image pickup section 3a has the same function as CCD solid-state image pickup 3 of the CCD image pickup unit of FIG. 1.

In this CCD image pickup unit, the decoder IC and the CCD solid-state image pickup are integrally combined into an IC, so that the number of the kinds of pulses to the integrally-combined IC can be reduced to three while eight kinds of pulses to CCD solid-state image pickup 3 are required in the conventional arrangement. The number of wiring lines from a camera head using the CCD image pickup unit is reduced by seven in comparison with the conventional arrangement, as in the case of the first embodiment.

Figure 13:
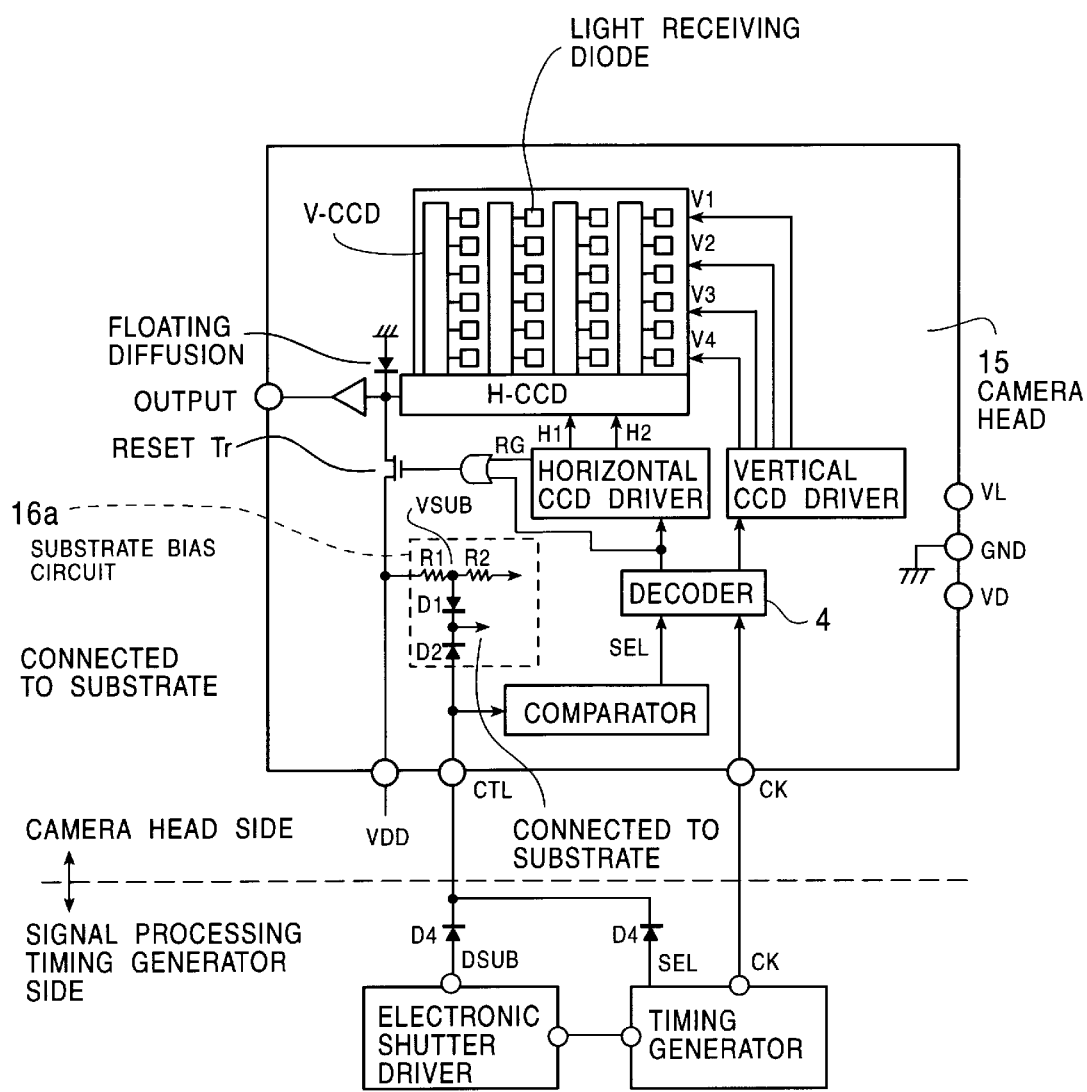
FIG. 13 is a block diagram showing details of the CCD image pickup unit of the present invention.

FIG. 13 is a block diagram showing the configuration of the third embodiment in more detail.

The present invention can be applied to an X-Y address type solid-state image pickup unit which scans pixels in a switching manner with a horizontal scanner and a vertical scanner as well as to CCD solid-state image pickup units.

What is claimed is:

1. An image generating device comprising:
   a solid-state image pickup having a plurality of vertical shift registers and a horizontal shift register;
   a decoder for decoding first and second input pulses to form pulses for driving said vertical shift registers, said horizontal shift register and a reset transistor for resetting a floating diffusion region in an output section of said horizontal shift register;

a vertical shift register driver for driving said vertical shift registers based on an output from said decoder; and a horizontal shift register driver for driving said horizontal shift register based on an output from said decoder;

wherein said decoder, said vertical shift register driver and said horizontal shift register driver are formed in one integrated circuit.

2. An image pickup unit comprising:

a solid-state image pickup region;

a plurality of vertical shift registers and a horizontal shift register for transferring signals from said solid-state image pickup region;

a decoder for decoding first and second input pulses to form pulses for driving said vertical shift registers, said horizontal shift register and a reset transistor for resetting a floating diffusion region in an output section of said horizontal shift register;

a vertical shift register driver for driving said vertical shift registers based on an output from said decoder; and a horizontal shift register driver for driving said horizontal shift register based on an output from said decoder, wherein said solid-state image pickup region, said decoder, said vertical shift register driver and said horizontal shift register driver are formed in one integrated circuit.

3. An image pickup unit comprising:

a solid-state image pickup region having a plurality of pixels;

a plurality of vertical shift registers and a horizontal shift register for transferring signals from the pixels of said image pickup region; and a decoder for decoding first and second input pulses to form pulses for driving said vertical shift registers and said horizontal shift register;

wherein a field discrimination pulse designating one of a first field and a second field is added to a pulse train of said input pulses at a trailing end thereof in a readout period for reading out signals from the pixels of said solid-state image pickup region to said vertical shift registers.

4. An image pickup unit according to claim 3, wherein a final period during the readout period in which the field discrimination pulse designating one of a first field and a second field is generated is a period for field discrimination, and wherein a vertical transfer operation in said readout period is completed before a beginning of said period for field discrimination.

5. An image pickup unit comprising:

a solid-state image pickup region having a plurality of pixels;

a plurality of vertical shift register and a horizontal shift register for transferring signals from the pixels of said image pickup region;

a decoder for decoding first and second input pulses to form pulses for driving said vertical shift registers and said horizontal shift register, a shutter pulse indicating whether an electronic shutter is on or off being added to a pulse train of the input pulses;

a substrate bias circuit for providing bias to a substrate;

a detection circuit for detecting the shutter pulse, said detection circuit being provided on the output side of said decoder; and a shutter driver for driving the electronic shutter on the basis of an output from said detection circuit, said shutter driver being provided on the output side of said decoder.

6. An image pickup unit according to claim 5, wherein the electronic shutter is always turned off in a first horizontal blanking period after driving the horizontal shift register for a first line after reading signals from the pixels of the solid-state image pickup region to said vertical shift registers.

7. An image pickup unit comprising:

a solid-state image pickup region having a plurality of pixels;

a plurality of vertical shift registers and a horizontal shift register for transferring signals from the pixels of said image pickup region;

a decoder for decoding first and second input pulses to form pulses for driving said vertical shift registers and said horizontal shift register; and a reset gate connected to said horizontal shift register, wherein said reset gate is on during the greater part of a horizontal blanking period and during a readout period for reading signals from the pixels of said solid-state image pickup region to said vertical shift registers.

8. An image pickup unit comprising:

a solid-state image pickup region;

a plurality of vertical shift registers and a horizontal shift register for transferring signals from said solid-state image pickup region;

a decoder for forming pulses for driving said vertical shift registers and said horizontal shift register by decoding first and second input pulses to provide vertical drive fundamental pulses and horizontal drive fundamental pulses and a selection pulse for discriminating the vertical and horizontal drive fundamental pulses from each other; and a substrate bias circuit for providing bias to a substrate;

wherein a shutter pulse is superimposed on said selection pulse.

* * * * *